United States Patent [19]
Parks

[11] Patent Number: 5,859,849
[45] Date of Patent: Jan. 12, 1999

[54] MODULAR SWITCH ELEMENT FOR SHARED MEMORY SWITCH FABRIC

[75] Inventor: Charley Michael Parks, Austin, Tex.

[73] Assignee: Motorola Inc., Austin, Tex.

[21] Appl. No.: 851,731

[22] Filed: May 6, 1997

[51] Int. Cl.[6] ........................................ H04J 3/24
[52] U.S. Cl. ...................... 370/395; 370/230; 370/388; 370/412; 370/422
[58] Field of Search ..................... 370/389, 390, 370/392, 395, 398, 399, 412, 413, 422, 423, 428, 230, 236, 388, 276

[56] References Cited

U.S. PATENT DOCUMENTS

| | | |
|---|---|---|
| 5,144,293 | 9/1992 | Rouse ........................................ 370/386 |
| 5,255,264 | 10/1993 | Cotton et al. ............................. 370/276 |
| 5,555,243 | 9/1996 | Kakuma et al. .......................... 370/388 |
| 5,689,500 | 11/1997 | Chiussi et al. ............................ 370/388 |

*Primary Examiner*—Douglas W. Olms
*Assistant Examiner*—Shick Hom
*Attorney, Agent, or Firm*—Lee E. Chastain

[57] ABSTRACT

A modular switch element (12) is programmable to operate in conjunction with varying numbers of other modular switch elements in a shared memory switch fabric (10). A single modular switch element type can be used to construct a range of shared memory switch fabrics operable over a wide range of bandwidth requirements.

18 Claims, 5 Drawing Sheets

MODULAR SWITCH ELEMENT FOR SHARED MEMORY SWITCH FABRIC

FIELD OF THE INVENTION

The present invention generally relates to digital electronic devices, and more specifically to devices used to route data in communications networks.

BACKGROUND OF THE INVENTION

Communication networks consist of a variety of hardware equipment and software and are increasing in use and complexity. The popularity of communication networks and the growth in the amount of data transferred between network users has forced the capacity of networks and protocols to increase with time. A variety of network communication protocols transfer data between devices coupled by a network. Ethernet and Asynchronous Transfer Mode are examples of such communication protocols.

Asynchronous Transfer Mode ("ATM", hereafter) provides bandwidths as low as 25 megabits/second using twisted cables and as high as 10 gigabits/second using optical cables. An ATM switch transfers cells between various points in a network. A cell contains control information, a header, and a data packet. The header within the cell contains switching identifiers enabling the ATM switch to route the data. The ATM switch interrogates each switching identifier it receives against a programmed list to determine which output channel the cell should be output. When the data packets are received by the intermediate node, destination information is contained in header which accompanies the data packet. The node determines whether it has previously agreed to route the data packets for that transmission by examining its memory to determine whether the destination information has previously been stored. If it has, a forwarding address has also been stored and the node forwards the data packet to the next node in the route toward the destination address.

The wide range of communications networks naturally results in a need for a wide variety of hardware. A first, brute force, method of supporting each network configuration is to design and manufacture an individual hardware solution for each possible application. Although such a product portfolio is very capable, it is also expensive to develop and maintain. A second method of supporting a wide variety of situations is to develop a single hardware product designed to meet the requirements of the most demanding application. For instance, a manufacturer might design a single ATM switch that operates at the highest expected bandwidth. Every user who needed less capacity than the most demanding application would simply not use the bandwidth. Typically, such a strategy involves hidden costs to either the manufacture or to the end user.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF THE DRAWINGS

Figure 1:
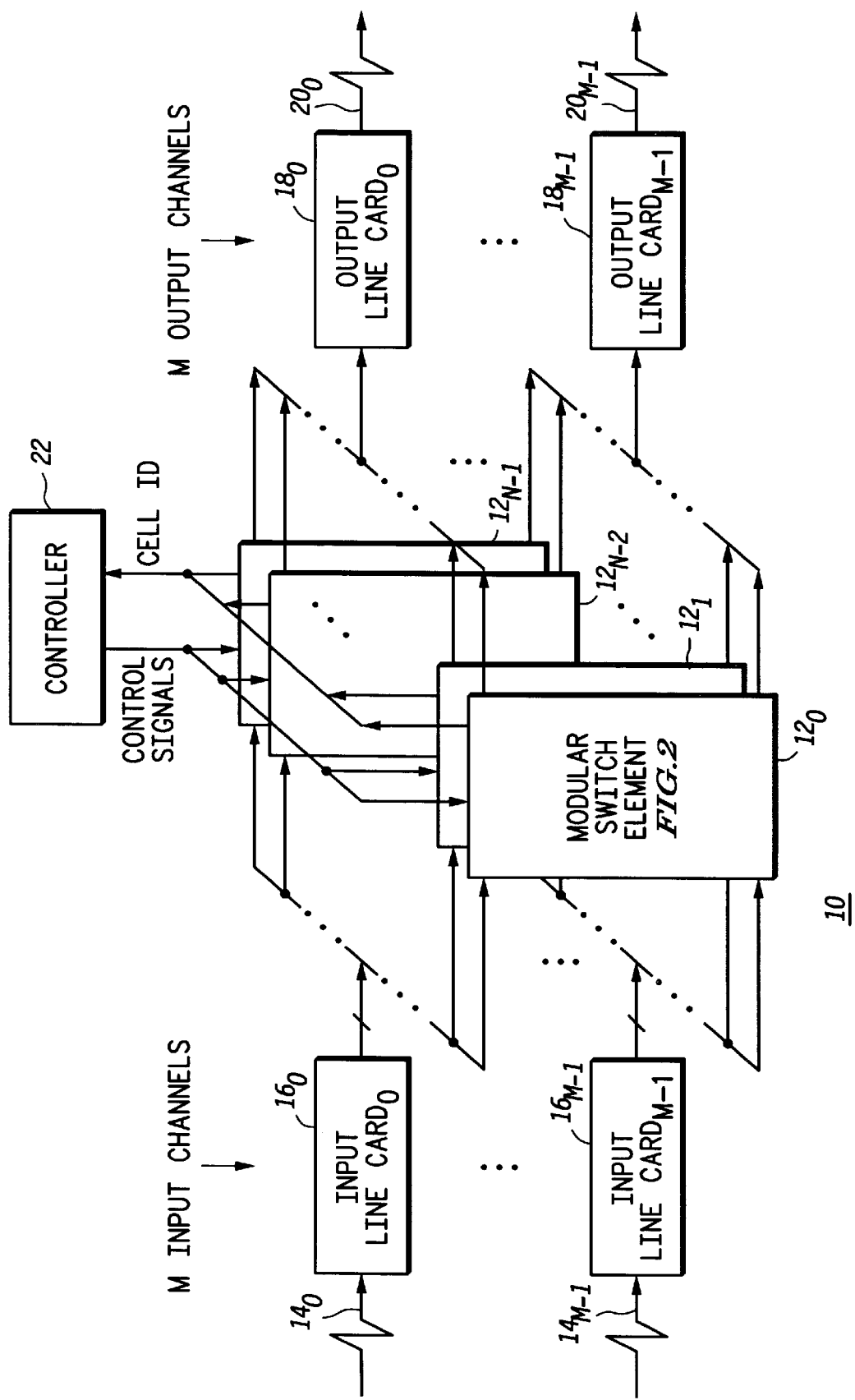
FIG. 1 depicts a block diagram of a shared memory switch fabric constructed in accordance with the present invention.

FIG. 1 depicts a block diagram of a shared memory switch fabric 10 constructed in accordance with the present invention. Shared memory switch fabric 10 comprises N modular switch elements (MSEs) $12_0$ through $12_{N-1}$, where N is an integer. MSEs $12_0$ through $12_{N-1}$ receive data from various sources, buffer the data, and route the data to various destinations depending upon routing information, typically contained in the information itself. Individually, MSEs $12_0$ through $12_{N-1}$ may be configured to act in groups of differing sizes to accommodate differing bandwidth requirements. For instance, only one MSE can be used if a low bandwidth shared memory switch fabric is desired. Conversely, eight MSEs can be combined to provide a high bandwidth shared memory switch fabric. In both cases, each MSE is the same. A manufacturer need only design and manufacture a single part for many applications. More advanced design and manufacturing techniques are not required to increase bandwidth between applications. Instead, the increased bandwidth of the eight MSE solution is achieved by the use of multiple MSEs. Further, bandwidth is not hidden and, hence, is not wasted, in the single MSE application. Consequently, an end user of the shared memory switch fabric does not pay for wasted bandwidth.

The disclosed invention may be conveniently discussed with respect to the following Table of Contents. No particular limitation should be attributed to any particular heading or to the classification of text into a particular heading:

I. Shared Memory Switch Fabric
   A. Connectivity
   B. Operation
   C. Modularity II. Modular Switch Elements (MSEs)
   A. Connectivity
   B. Control Signal Description
   C. Operation
      i. General operation
      ii. Input shift-registers/input holding registers
      iii. Memory array operations
      iv. Modularity, address register use, and SIZE
      v. Output holding registers/output shift-registers and HOLD signal III. Operating Examples
   A. Write Cycle Example
   B. Read Cycle Example
   C. $\overline{\text{HOLD}}$ Example

I. Shared memory switch fabric 10

A. Connectivity

Continuing with FIG. 1, M line inputs $14_0$ through $14_{M-1}$ are coupled to differing ones of M input line cards $16_0$ through $16_{M-1}$, where M is an integer. Typically, each one of the M line inputs $14_0$ through $14_{M-1}$ is a separate ATM input channel. An output of the Ith one of the M input line cards is coupled to the Ith input channel of each MSE, where I is an integer index ranging from 0 to M-1. An Ith output channel of each MSE is coupled to an Ith one of M output line cards $18_0$ through $18_{M-1}$. A differing one of the M output line cards generates a differing one of M line outputs $20_0$ through $20_{M-1}$. Again, each one of the M line outputs is a separate ATM channel. Each MSE receives a single serial bit per channel and outputs a single bit per channel. However, the number of bits output by each input line card per channel and the number of bits received by each output line card per channel depends upon the number of MSEs in shared memory switch fabric 10. Generally N MSEs receive N bits per channel from M input line cards and output N bits per channel to M output line cards. The particular connections between the input line cards, the MSEs, and the output line cards are described more fully below.

Shared memory switch fabric 10 also comprises a controller 22 bi-directionally coupled to MSEs $12_0$ through $12_{N-1}$. Specifically, MSEs $12_0$ through $12_{N-1}$ transmit a CELL ID to and receive CONTROL SIGNALS from controller 22. Controller 22 may be a microprocessor, microcontroller, or other suitable intelligent actor. Controller 22 determines where received data packet is to be stored in each MSE and to which output channel each packet is to be routed.

In the depicted embodiment, inputs and outputs to shared memory switch fabric 10 are coupled to different sets of line cards. In other embodiments, input and output functions may be managed by a single set of input/output line cards. Further, there is no requirement in the disclosed invention that the number of input channels and the number of output channels by equal ($M_{IN} \neq M_{OUT}$). Instead, such equivalency is depicted to facilitate the illustration of the shared memory switch fabric in which there is a single set of input/output line cards.

I. Shared memory switch fabric 10
B. Operation

In general, input line cards $16_0$ through $16_{N-1}$ receive from zero to N packets of data in parallel, depending upon the number of connected inputs and their dynamic use at each particular moment in time. The input line cards buffer these packets and output them to the corresponding input channel of MSEs $12_0$ through $12_{N-1}$. The input line cards may also process routing information embedded in the data they receive to facilitate routing by the MSEs or by controller 22. Towards this end, the input line cards may directly communicate (not shown) with controller 22. The MSEs store their data in N memory arrays (one array per MSE, shown in FIG. 2) before outputting the data to the various output line cards $18_0$ through $18_{M-1}$ as required by the destination of the information. The MSEs output from zero to N packets of data in parallel to the output line cards, depending upon the instantaneous and historical distribution of destinations. For instance, if the MSEs contain M data packets addressed to M differing output channels, then the MSEs can output M packets in parallel to the output line cards. Conversely, if the MSEs receive M data packets addressed to the same output channel, then the MSEs must buffer the packets and output them to the same channel over M separate transfers. In this case, shared memory switch fabric 10 will output but a single data packet at a time.

I. Shared memory switch fabric 10
C. Modularity

MSEs $12_0$ through $12_{N-1}$ are designed to be easily configurable to operate in systems incorporating one, two, four, and eight MSEs. In each case, there are thirty-two input and output channels (M=32). Each data packet or cell of information contains sixty-four bytes (512 bits) of routing information and/or data.

If M equals 1, then each of input line cards $16_0$ through $16_{N-1}$ outputs a single bit per channel to MSE $12_0$. Similarly, MSE $12_0$ outputs a single bit to each channel of output line cards $18_0$ through $18_{N-1}$. To transfer the amount of data described above, each of input line cards $16_0$ through $16_{N-1}$ outputs 512 serial bits to MSE $12_0$ per channel. Similarly, MSE $12_0$ output 512 serial bits per channel to the output line cards. As will be described below in connection with FIG. 2, MSE $12_0$ processes the 512 serial bits as eight memory read/write operations of sixty-four bits each.

If M equals 2, then each of input line cards $16_0$ through $16_{N-1}$ outputs two bits per channel: a single bit to each one of MSEs $12_0$ and $12_1$. Similarly, both of MSEs $12_0$ and $12_1$ output a single bit (two bits in parallel) to each channel of output line cards $18_0$ through $18_{N-1}$. To transfer the amount of data described above, each of input line cards $16_0$ and $16_1$ outputs 256 pairs of two bits to MSE $12_0$ and $12_1$. Similarly, MSE $12_0$ and $12_1$ output 256 pairs of two bits per channel to the output line cards. As will be described below in connection with FIG. 2, each of MSEs $12_0$ and $12_1$ processes its 256 serial bits as four memory read/write operations of sixty-four bits each.

If M equals 4, then each of input line cards $16_0$ through $16_{N-1}$ outputs four bits per channel: a single bit to a differing one of MSEs $12_0$, $12_1$, $12_2$, and $12_3$. Similarly, each of MSEs $12_0$, $12_1$, $12_2$, and $12_3$ outputs a single bit (four bits in parallel) to each channel of output line cards $18_0$ through $18_{N-1}$. To transfer the amount of data described above, each of input line cards $16_0$ through $16_{N-1}$ outputs 128 sets of four bits to MSE $12_0$, $12_1$, $12_2$, and $12_3$. Similarly, MSE $12_0$, $12_1$, $12_2$, and $12_3$ output 128 sets of four bits per channel to the output line cards. As will be described below in connection with FIG. 2, each MSE $12_0$, $12_1$, $12_2$, and $12_3$ processes its 128 serial bits as four memory read/write operations of sixty-four bits each.

In the depicted embodiment of shared memory switch fabric 10, M equals 8, a high bandwidth shared memory switch fabric. Consequently, each of input line cards $16_0$ through $16_{N-1}$ outputs eight bits per channel: a single bit to a differing one of MSEs $12_0$, $12_1$, $12_2$, $12_3$, $12_4$, $12_5$, $12_6$, and $12_7$. Similarly, each of MSEs $12_0$ through $12_7$ outputs a single bit per channel (eight bits in parallel) to each channel of output line cards $18_0$ through $18_{N-1}$. To transfer the amount of data described above, each of input line cards $16_0$ through $16_{N-1}$ outputs sixty-four beats of eight-bits per beat to MSEs $12_0$ through $12_7$. Similarly, MSE $12_0$ through $12_8$ output 64 sets of eight bits per channel to the output line cards. As will be described below in connection with FIG. 2, each of MSEs $12_0$ through $12_7$ process its sixty-four serial bits as a single memory read/write operation.

Figure 2:
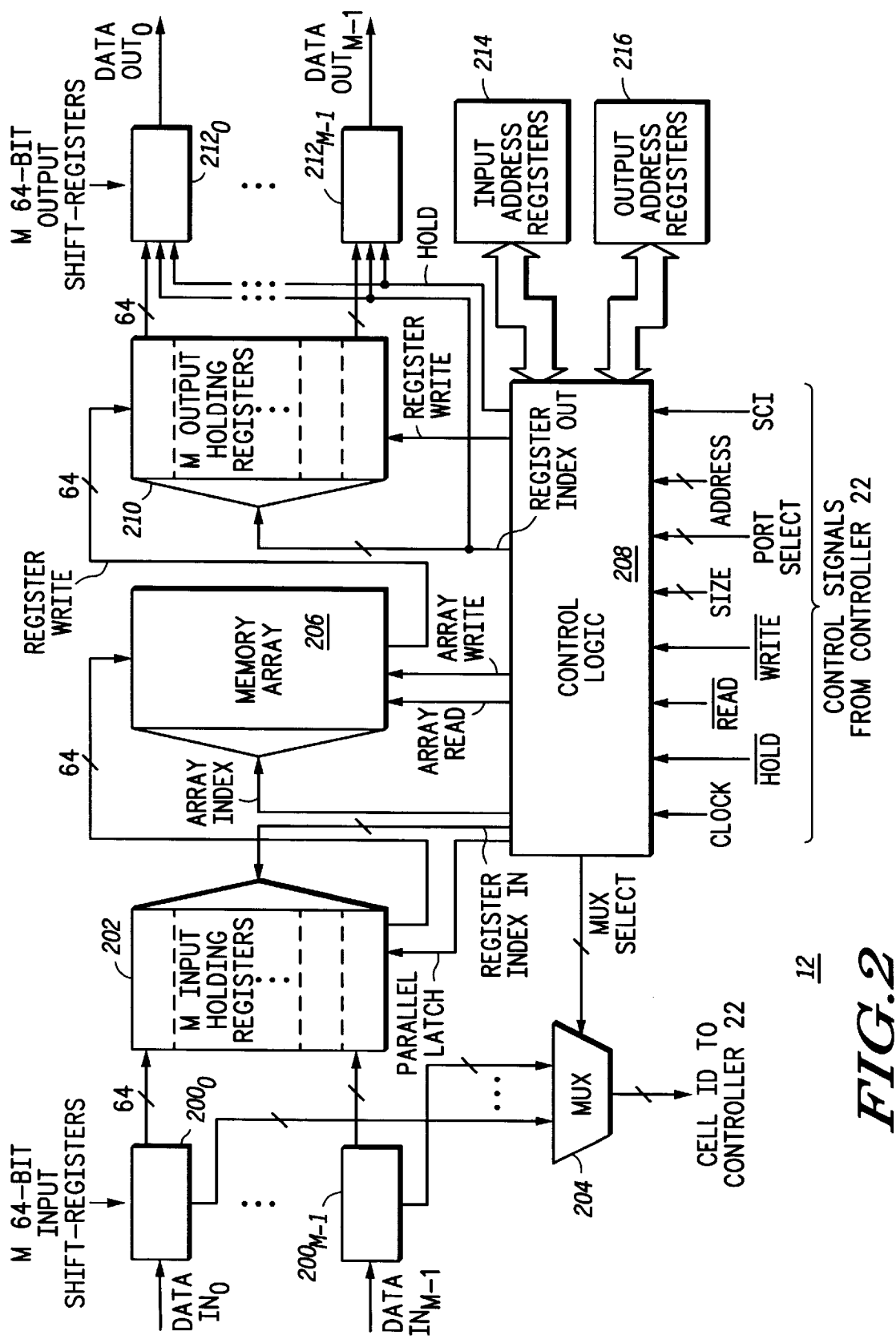
FIG. 2 depicts a block diagram of a modular switch element illustrated in FIG. 1.

II. Modular Switch Elements (MSEs) $12_0$ through $12_{N-1}$
A. Connectivity FIG. 2 depicts a block diagram of modular switch element 12 illustrated in FIG. 1. M 64-bit input shift-registers $200_0$ through $200_{M-1}$ receive M single-bit data inputs DATA $IN_0$ through DATA $IN_{M-1}$ The M single-bit data inputs are generated by the M input line cards $16_0$ through $16_{M-1}$ (depicted in FIG. 2). The M 64-bit input shift-registers output M sixty-four bit data quantities in parallel to M input holding registers, collectively, 202 and a portion of each of the M sixty-four bit quantities to an M:1 multiplexer (labeled MUX) 204. In the preferred embodiment, the first eleven bits of each of the M sixty-four bit input shift-registers is coupled to a differing one of M inputs of multiplexer 204. The eleven bits of each quantity identify the destination of the corresponding data. A single 64-bit output from registers 202 is connected to the bit lines of a memory array 206.

A control logic block 208 receives the control signals CLOCK, $\overline{\text{HOLD}}$, $\overline{\text{READ}}$, $\overline{\text{WRITE}}$, SIZE, PORT SELECT, ADDRESS, and SCI (start of cell identifier) from controller 22 (depicted in FIG. 1) Control logic block 208 generates the control signals for the M input holding registers 202 (PARALLEL LATCH), for multiplexer 204 (MUX SELECT), for memory array 206 (ARRAY INDEX, ARRAY READ, and ARRAY WRITE), for M output holding registers 210 (REGISTER WRITE and REGISTER INDEX OUT)., and for M 64-bit output shift-registers $212_0$ through $212_{M-1}$ (HOLD and REGISTER INDEX OUT).

M output holding registers receive a single 64-bit data input per transfer from the output of memory array 206. The M output holding registers output M sixty-four bit data quantities in parallel to the M 64-bit output shift-registers. The M 64-bit output shift-registers output M single-bit data outputs DATA $OUT_0$ through DATA $OUT_{M-1}$. The M single-bit outputs DATA OUT0 through DATA $OUT_{M-1}$ are connected to the M output line cards $18_0$ through $18_{M-1}$ (depicted in FIG. 2). An input address register file 214 and an output address register file 216 are each bi-directionally coupled to control logic block 208.

II. Modular Switch Elements (MSEs) $12_0$ through $12_{N-1}$

B. Control Signal Description

Controller 22 generates the control signals ADDRESS, CLOCK, $\overline{HOLD}$, PORT SELECT, $\overline{READ}$, SCI, SIZE, and $\overline{WRITE}$.

ADDRESS, used in conjunction with $\overline{READ}$ and $\overline{WRITE}$, specifies the source or destination cell in memory array 206 for a read or a write operation, respectively.

CLOCK is a periodic timing signal used to synchronize the operation of shared memory switch fabric 10.

$\overline{HOLD}$, when asserted, delays the 64-bit output shift-registers from serially shifting their contents out. $\overline{HOLD}$ has no effect on a 64-bit output shift-register that has already begun shifting out its contents.

PORT SELECT, used in conjunction with $\overline{READ}$ and $\overline{WRITE}$, specifies the destination or source register in output holding registers 210 and input holding registers 202 for a read or a write operation, respectively.

$\overline{READ}$ indicates that data on ADDRESS and PORT SELECT define a read operation from a specified memory array location to a specified output holding register.

SCI (start of cell identifier) indicates the beginning of a 512-bit data packet. The frequency of SCI depends upon the number of MSEs in shared memory switch fabric 10 (See SIZE).

SIZE indicates the number of MSEs in shared memory switch fabric 10. The described embodiment supports one, two, four, or eight MSEs in shared memory switch fabric 10.

$\overline{WRITE}$ indicates that data on ADDRESS and PORT SELECT define a write operation from a specified input holding register to a specified memory array location.

Control logic block 208 generates the control signals ARRAY INDEX, ARRAY READ, ARRAY WRITE, HOLD, MUX SELECT, PARALLEL LATCH, REGISTER INDEX IN, REGISTER INDEX OUT, and REGISTER WRITE.

ARRAY INDEX specifies the source of a memory read operation and the destination of a memory write operation.

ARRAY READ indicates that a memory transfer is from memory array 206 to the output holding registers.

ARRAY WRITE indicates that a memory transfer is from the input holding registers to memory array 206.

HOLD is a buffered version of $\overline{HOLD}$.

MUX SELECT selects which one of the M inputs to multiplexer 204 is output to controller 22.

PARALLEL LATCH causes the M input holding registers to simultaneously latch M 64-bit quantities from the 64-bit input shift-registers.

REGISTER INDEX IN specifies a particular one of the M input holding registers as the source of a memory write operation.

REGISTER INDEX OUT specifies a particular one of the M output holding registers as the destination of a memory read operation.

REGISTER WRITE causes the output holding register specified by REGISTER INDEX OUT to latch the output of memory array 206.

II. Modular Switch Elements (MSEs) $12_0$ through $12_{N-1}$

C. Operation i. General operation

In operation, MSE 12 is fully pipelined. Consequently, its various operating features are continuous and overlapping. It may be convenient to divide the operation of MSE 12 into sixty-four clock cycle intervals for purposes of illustration. As described above, M equals thirty-two and N equals eight in the depicted embodiment. For purposes of clearly illustrating one configuration of shared memory switch fabric 10, these specific values will be substituted for M and N in the following discussion.

ii. Input shift-registers/input holding registers

At the beginning of each hypothetical sixty-four clock cycle window, control logic block 208 causes the input holding registers to simultaneously latch thirty-two sixty-four bit quantities stored in the 64-bit input shift-registers. The input shift-registers can then begin serially receiving the next set of sixty-four bit quantities from the input channels. Control logic block 208 causes such latching by the appropriate conditioning of the input control signal CLOCK and the control signal SCI (start-of-cell-input) and an internal count-to-sixty-four signal.

For N=1, controller 22 will assert the control signal SCI once every eight sixty-four cycle windows. Therefore, control logic block 208 will assert the control signal LATCH seven other times, on sixty-four cycle boundaries between successive assertions of the control signal SCI. For N=2, controller 22 will assert the control signal SCI once every four sixty-four clock cycle windows. Therefore, control logic block 208 will assert the control signal LATCH three other times, on sixty-four cycle boundaries between successive assertions of the control signal SCI. For N=4, controller 22 will assert the control signal SCI once every other sixty-four clock cycle window. Therefore, control logic block 208 will assert the control signal LATCH one other time, on a sixty-four cycle boundary between successive assertions of the control signal SCI. For N=8, controller 22 will assert the control signal SCI once every sixty-four clock cycle window. Therefore, control logic block 208 does not need to assert the control signal LATCH any other time.

Control logic block 208 sequentially outputs the first eleven bits of each input shift-register to controller 22 (shown in FIG. 2) through multiplexer 204. Control logic block 208 selects each eleven bit quantity by cycling through the thirty-two permutations of the control signal MUX SELECT.

iii. Memory array operations

Control logic block 208 then spends the next sixty-four cycles performing thirty-two writes into memory array 206 and thirty-two reads from memory array 206. These two classes of operations store received data for later routing and route previously stored data to the appropriate output channels, respectively.

Control logic block 208 stores thirty-two sixty-four bit quantities latched in the input holding registers into memory array 206. Control logic block 208 accesses data buffered in particular ones of the input holding registers for storage into memory array 206 by the control signal REGISTER INDEX IN. Control logic block 208 stores the selected output into memory array 206 by simultaneously asserting the control signal ARRAY WRITE and placing the destination address of the data quantity onto the control signal ARRAY INDEX.

Similarly, control logic block 208 reads thirty-two sixty-four bit quantities from memory array 206 and stores them into the output holding registers. Control logic block 208 reads selected data from memory array 206 by simultaneously asserting the control signal ARRAY READ and placing the source address of the data quantity onto the control signal ARRAY INDEX. Control logic block 208 writes the selected data to particular ones of the output holding registers by simultaneously asserting the control signal REGISTER WRITE and placing the destination register identifier onto the control signal REGISTER INDEX OUT.

Control logic block 208 determines the memory array destinations for array writes and the memory array sources for array reads by the contents of input address register file 214, output address register file 216, and the control signals CLOCK, SIZE, and SCI. In general, the contents of input address register file 214 specifies M destinations in memory array 206 for the M input holding registers. Similarly, the contents of output address register file 216 specifies M sources in memory array 206 for the M output holding registers. These addresses are invalidated after each use.

iv. Modularity address register use, and SIZE

As described above, the number of MSEs in shared memory switch fabric 10 determines the number of sixty-four bit transfers comprising each 512-bit data packet. Consequently, the operation of the input address register file and the output address register file vary depending upon the number of MSEs in shared memory switch fabric 10. In the preferred embodiment, the control signal SIZE supports four encodings that indicate the number of MSEs in shared memory switch fabric 10: one, two, four, or eight.

If the control signal SIZE indicates that there is one MSE in shared memory switch fabric 10, then control logic block 208 uses each address in the input address register file and each address in the output address register file eight times over eight sixty-four clock cycle windows. Each time control logic unit 208 uses an address, it increments the address by one. Control logic block 208 increments the address by concatenating the (D-3) most significant bits of each address with a three bit counter, where D is the number of bits in each address. Control logic block 208 increments the counter after each sixty-four clock cycle window. Control logic block 208 invalidates each address after it concatenates the address with the bit pattern $111_{binary}$. Ultimately, control logic block 208 stores eight sixty-four bit transfers from each input channel in eight sequential memory addresses.

Similarly, control logic block 208 outputs eight sixty-four bit transfers from eight sequential memory address to the same output channel over eight sixty-four clock cycle windows. Note, eight sixty-four bit transfers from the same channel comprise one data packet when there is one MSE in shared memory switch fabric 10.

If the control signal SIZE indicates that there are two MSEs in shared memory switch fabric 10, then control logic block 208 uses each address in the input address register file and each address in the output address register file four times over four sixty-four clock cycle windows. Each time control logic unit 208 uses an address, it increments the address by one. Control logic block 208 increments the address by concatenating the (D-2) most significant bits of each address with the two least significant bits of the three bit counter. Control logic block 208 increments the counter after each sixty-four clock cycle window. Control logic block 208 invalidates each address after it concatenates the address with the bit pattern $X11_{binary}$, where X indicates a "don't care." Ultimately, control logic block 208 stores four sixty-four bit transfers from each input channel in four sequential memory addresses. Similarly, control logic block 208 outputs four sixty-four bit transfers from four sequential memory address to the same output channel over four sixty-four clock cycle windows. Note, four sixty-four bit transfers from the same channel comprise one data packet when there are two MSEs in shared memory switch fabric 10.

If the control signal SIZE indicates that there are four MSEs in shared memory switch fabric 10, then control logic block 208 uses each address in the input address register file and each address in the output address register file twice over two sixty-four clock cycle windows. Each time control logic unit 208 uses an address, it increments the address by one. Control logic block 208 increments the address by concatenating the (D-1) most significant bits of each address with the least significant bit of the three bit counter. Control logic block 208 increments the counter after each sixty-four clock cycle window. Control logic block 208 invalidates each address after it concatenates the address with the bit pattern $XX1_{binary}$, where X indicates a "don't care." Ultimately, control logic block 208 stores two sixty-four bit transfers from each input channel in two sequential memory addresses. Similarly, control logic block 208 outputs two sixty-four bit transfers from two sequential memory address to the same output channel over two sixty-four clock cycle windows. Note, two sixty-four bit transfers from the same channel comprise one data packet when there are four MSEs in shared memory switch fabric 10.

If the control signal SIZE indicates that there are eight MSEs in shared memory switch fabric 10, then control logic block 208 uses each address in the input address register file and each address in the output address register file once. Control logic block 208 stores a single sixty-four bit transfer from each input channel in memory array 206. Similarly, control logic block 208 outputs a single sixty-four bit transfer to each output channel. Note, a single sixty-four bit transfer from the same channel comprises one data packet when there are eight MSEs in shared memory switch fabric 10.

During each sixty-four clock cycle window, controller 22 stores new values into the input address register file 214 and into the output address register file 216 (M=8). The frequency of this operation is reduced to once every other window for M=4, to once every four windows for M=2, and to once every eight windows for M=1. Controller 22 writes an input holding register-memory address mapping into MSE 12 by asserting the control signal $\overline{READ}$ and by placing the desired input holding register identifier and memory address onto the inputs PORT SELECT and ADDRESS, respectively. Controller 22 will store the address in the register corresponding to the identified input holding register in input address register file 214. Similarly, controller 22 writes an output holding register-memory address pair into MSE 12 by asserting the control signal $\overline{WRITE}$ and by placing the desired output holding register identifier and memory address onto the inputs PORT SELECT and ADDRESS, respectively. Controller 22 will store the address in the register corresponding to the identified output holding register in input address register file 214.

v. Output holding registers/output shift-registers and HOLD signal

Each output holding register automatically forwards its contents to its associated 64-bit output shift-register once loaded by memory array 206. The associated 64-bit output shift-register then begins serially shifting its contents out through the connected output channel.

Controller 22 may delay the output shifting of the 64-bit output shift-registers by asserting the control signal $\overline{\text{HOLD}}$. The control signal $\overline{\text{HOLD}}$ is buffered by control logic block 208 and output as HOLD. The 64-bit output shift-registers will delay shifting out their contents as long as controller 22 asserts the control signal $\overline{\text{HOLD}}$. The assertion of $\overline{\text{HOLD}}$ will not delay any 64-bit output shift-register that has already begun outputting its data. The control signal $\overline{\text{HOLD}}$ can be advantageously used to synchronize the output of all or of some of the 64-bit output shift-registers with each other. The control signal $\overline{\text{HOLD}}$ is described below in connection with FIG. 5.

III. Operating Examples

A. Write Cycle Example

Figure 3:
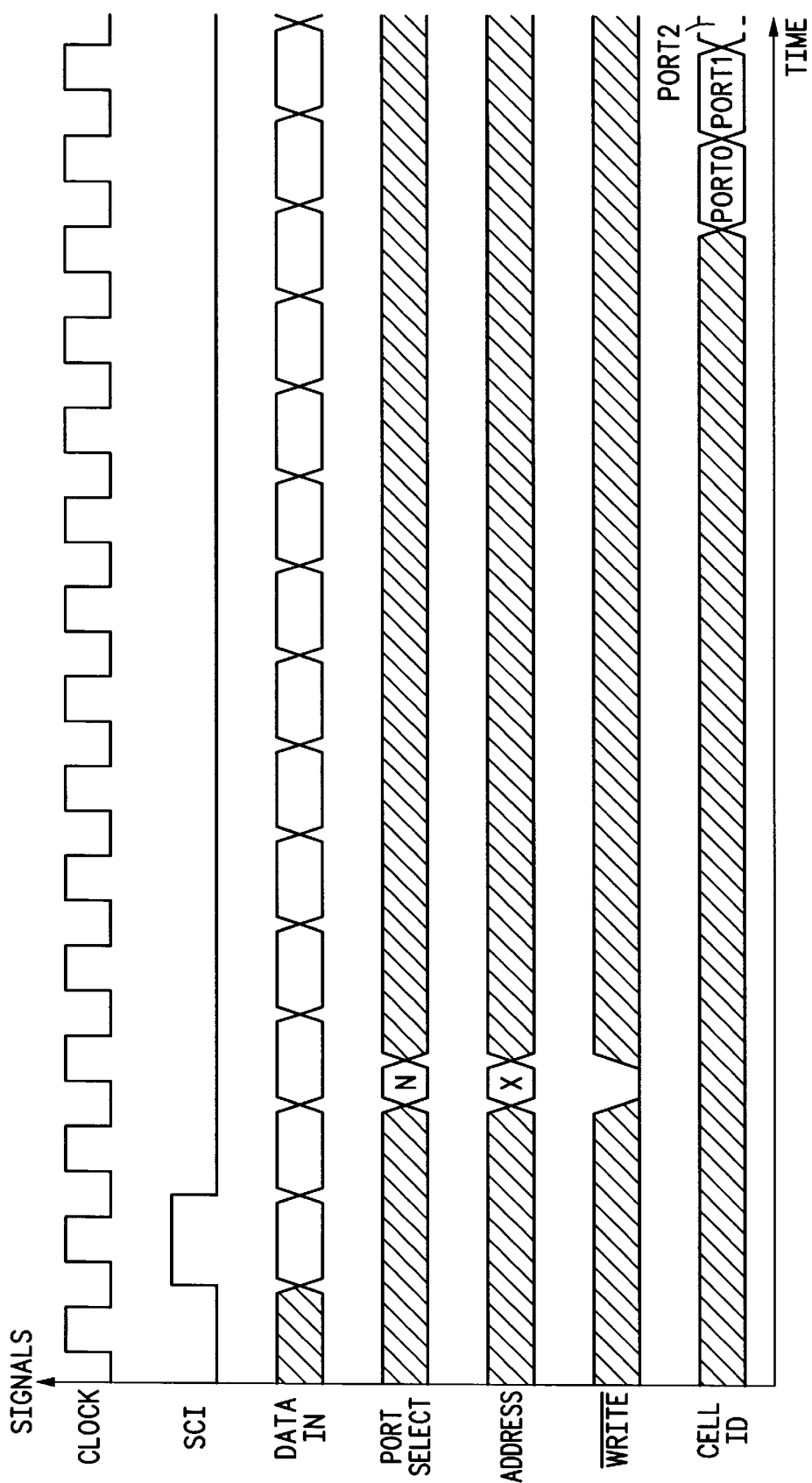
FIG. 3 depicts a timing diagram of a write cycle of the modular switch element illustrated in FIG. 2.

FIG. 3 depicts a timing diagram of a write cycle of MSE 12 illustrated in FIG. 2. All signals and operations are synchronized to an externally generated timing control signal CLOCK. Controller 22 asserts the control signal SCI (start-of-cell-identifier) indicating that the first bit of a data packet is present on each of the input channels. Controller 22 now has the next sixty-four cycles to program thirty-two write operations and thirty-two read operations. In the case of a write operation, controller 22 specifies a source ("N") from the input holding registers and a corresponding destination ("X") within the memory array by placing N and X on the inputs PORT SELECT and ADDRESS, respectively. Controller 22 simultaneously asserts the control signal $\overline{\text{WRITE}}$. Control logic block 208 performs two actions in response to the write operation. First, control logic block 208 stores the value X into the Nth one of input address register file 214. Second, control logic block 208 stores the contents of the Nth one of input holding register file 214 into the memory array after 64 bits have been received by the corresponding input shift register $200_N$ and transferred into the input holding register. Control logic block 208 saves the write operation parameters because it will use them again in certain circumstances. As described above, control logic block 208 reuses the same input holding register-memory array address in configurations in which there are fewer than eight MSEs. Otherwise, control logic block 208 only uses an input holding register-memory array address once.

The assertion of the control signal SCI also begins the data packet or cell identification process. Each of the input shift-registers forwards the first eleven bits of each cell to multiplexer 204. Control logic block 208 sequentially forwards each of these eleven bit quantities to controller 22. As depicted in FIG. 3, there is an eleven cycle delay between the beginning of a cell and the delivery of the first CELL ID to controller 22 to amass eleven input bits for the first input channel.

B. Read Cycle Example

Figure 4:
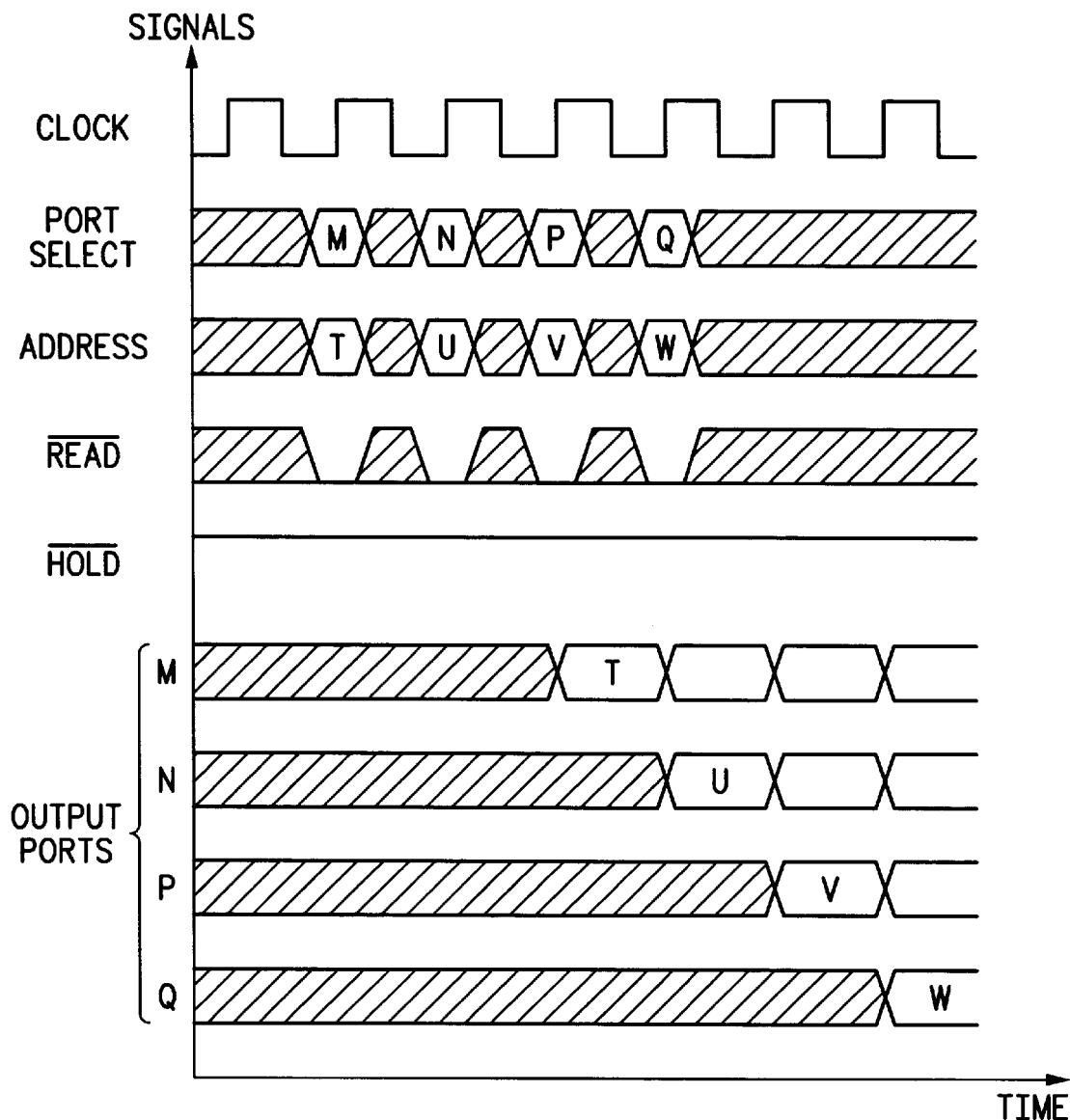
FIG. 4 depicts a first timing diagram of four read cycles of the modular switch element illustrated in FIG. 2.

FIG. 4 depicts a first timing diagram of four read cycles of MSE 12 illustrated in FIG. 2. Again, all signals and operations are synchronized to an externally generated timing control signal CLOCK. Continuing from FIG. 3 above, controller 22 now performs four of the thirty-two read operations. Specifically, controller 22 specifies four sources ("T, U, V, and W") within the memory array and four corresponding destinations (M, N, P, and Q) within the output holding registers by placing pairs M-T, N-U, P-V, and Q-W on the inputs PORT SELECT and ADDRESS, respectively, over four clock cycles. Controller 22 simultaneously asserts the control signal $\overline{\text{READ}}$ with each memory array address-output holding register pair. Control logic block 208 performs two actions in response to each read operation. First, control logic block 208 loads the contents of the specified memory array address into the destination output holding register. Control logic block 208 also forwards this output to the corresponding output shift-register where it appears serially on the specified output channel. As depicted in the FIG., there is a two cycle delay between a read operation and the appearance of the specified data on the specified output port. Second, control logic block 208 stores the value T into the Mth one of output address register file 216. Control logic block 208 saves the write operation parameters because it will use them again in certain circumstances. As described above, control logic block 208 reuses the same output address in configurations in which there are fewer than eight MSEs. Otherwise, control logic block 208 only uses an output address once.

FIG. 4 also depicts the pipelined nature of MSE 12. Four read operations performed in consecutive cycles output four values to four different output channels.

C. $\overline{\text{HOLD}}$ Example

Figure 5:
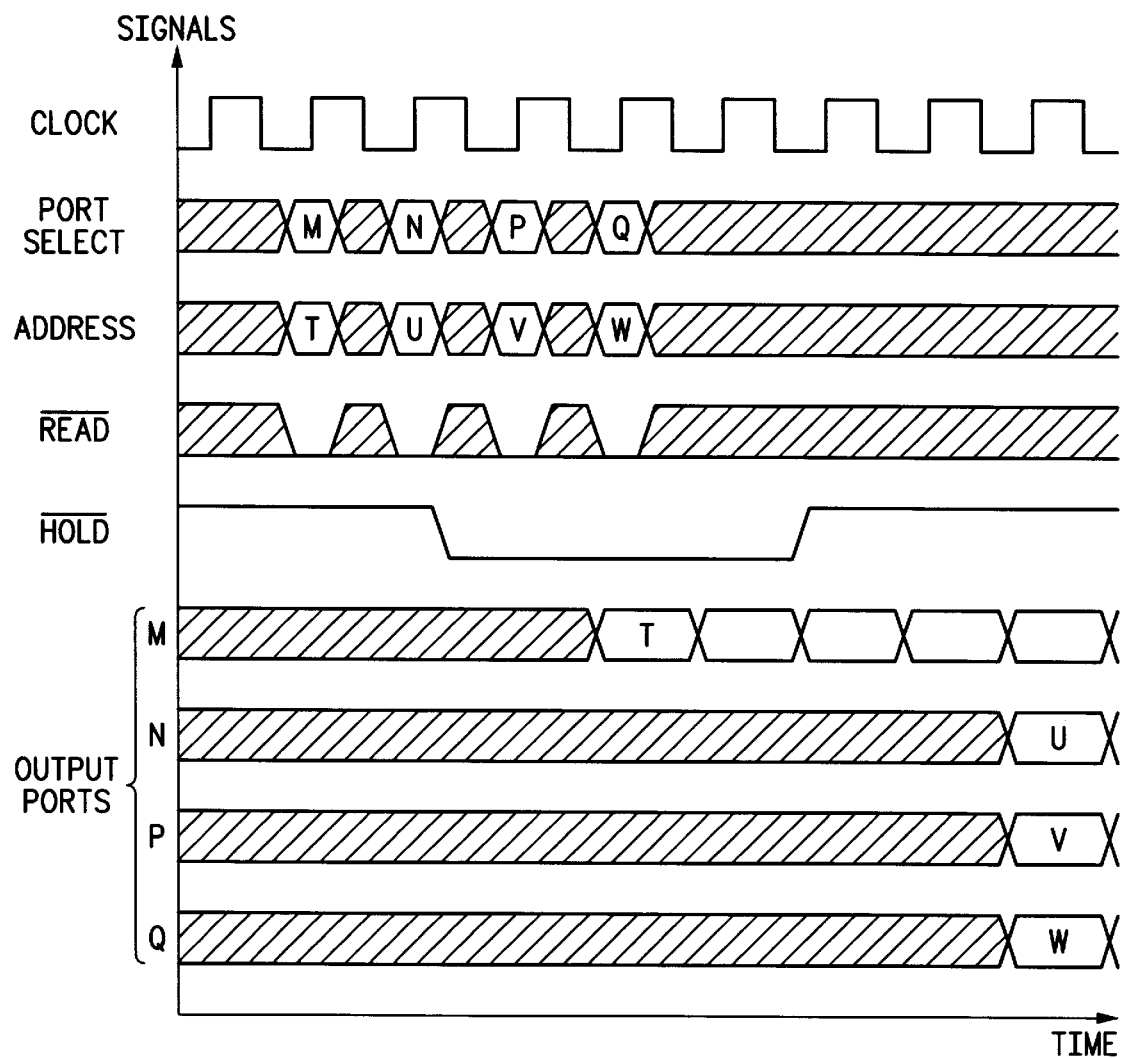
FIG. 5 depicts a second timing diagram of four read cycles of the modular switch element illustrated in FIG. 2.

FIG. 5 depicts a second timing diagram of four read cycles of MSE 12 illustrated in FIG. 2. The example illustrated in FIG. 5 is substantially identical to the example illustrated in FIG. 4. In FIG. 5, however, the control signal $\overline{\text{HOLD}}$ is asserted during the input of the second, third, and fourth memory array address-output holding register pairs. Consequently, control logic block 208 outputs the contents of the Tth memory array address through the Mth output port two cycles after receiving the operation from controller 22. Control logic block 208 delays the remaining read operations until $\overline{\text{HOLD}}$ is de-asserted and two clock cycles elapse. As a result, the second, third, and fourth read operations are synchronized with each other.

Although the present invention has been described with reference to a specific embodiment, further modifications and improvements will occur to those skilled in the art. For instance, the depicted embodiment describes a particular division of the control functions of shared memory switch fabric 10 between controller 22 and control logic block 208. This division is arbitrary. Also, all control functions may be provided by a single circuit incorporated within MSE 12 or outside of MSE 12. It is to be understood therefore, that the invention encompasses all such modifications that do not depart from the spirit and scope of the invention as defined in the appended claims.

I claim:

1. A modular switch element for shared memory switch fabric, comprising:

a plurality of input ports;

a plurality of output ports;

a memory array coupled to the plurality of input ports and to the plurality of output ports; and a control logic unit coupled to the plurality of input ports, to the plurality of output ports, and to the memory array, the control logic receiving a size signal representative of a number of modular switch elements in a shared memory switch fabric, the control logic unit writing data input to the plurality of input ports into the memory array responsive to a first set of control signals and the size signal, and the control logic reading data stored in the memory array to the plurality of output ports responsive to a second set of control signals and the size signal, wherein one of the first set of control signals indicates a beginning of a data cell.

2. The modular switch element of claim 1 wherein the first and second set of control signals are generated by an input address register file and an output address register file, respectively.

3. The modular switch element of claim 1 further comprising a cell identifier bus, wherein the cell identifier bus outputs a predetermined portion of each data cell.

4. A modular switch element for shared memory switch fabric, comprising:
- a plurality of input ports;
- a plurality of output ports;
- a memory array coupled to the plurality of input ports and to the plurality of output ports; and
- a control logic unit coupled to the plurality of input ports, to the plurality of output ports, and to the memory array, the control logic receiving a size signal representative of a number of modular switch elements in a shared memory switch fabric, the control logic unit writing data input to the plurality of input ports into the memory array responsive to a first set of control signals and the size signal, and the control logic reading data stored in the memory array to the plurality of output ports responsive to a second set of control signals and the size signal; and
- a plurality of input shift-registers and a plurality of output shift-registers coupled to the plurality of input ports and to the plurality of output ports, respectively.

5. The modular switch element of claim 4, wherein the first and second set of control signals are generated by an input address register file and an output address register file, respectively.

6. The modular switch element of claim 4 further comprising a cell identifier bus, wherein the cell identifier bus outputs a predetermined portion of each data cell.

7. A modular switch element for shared memory switch fabric, comprising:
- N M-bit input shift-registers, where N and M are a non-zero integers;
- N input registers coupled to the N M-bit input shift-registers;
- a memory array coupled to the N input registers;
- N output registers coupled to the memory array;
- N M-bit output shift-registers coupled to the N output registers;
- N input address registers;
- N output address registers; and
- control logic coupled to the N M-bit input shift-registers, to the N input registers, to the memory array, to the N output registers, to the N M-bit output shift-registers, to the N input address registers, and to the N output address registers,
- wherein each the N M-bit input shift-registers serially receives a data cell and outputs an M-bit datum to one of the N input registers, where the control logic writes each M-bit datum to a differing location in the memory array, the location determined responsive to a differing one to the N input address registers and to a start frame signal, where the control logic reads a differing location in the memory array to a differing one of the N output registers responsive to the N output address registers, and where the N M-bit output shift-registers receive in parallel N M-bit data cells from the N output registers and serially output the N M-bit data cells.

8. The modular switch element of claim 7 further comprising a cell identifier bus, wherein the cell identifier bus outputs a predetermined portion of each data cell.

9. The modular switch element of claim 7 wherein a plurality of the N M-bit output shift-registers simultaneously begins outputting a plurality of the N data cells.

10. The modular switch element of claim 7 wherein the control logic invalidates each one of the N input address registers after receiving the start frame signal.

11. The modular switch element of claim 7 wherein the control logic further comprises a counter, wherein an output of the counter is incremented with each M-bit datum, wherein a portion of the output of the counter is concatenated to each one of the N input address registers, the portion being responsive to an input size signal, and wherein each one of the N input address registers and each one of the N output address registers is invalidated upon an occurrence of a predetermined pattern in the counter.

12. A shared memory switch fabric for routing data cells between I inputs and O outputs, each data cell comprising B bits, where I, O, and B are non-zero integers, the shared memory switch fabric comprising:
- E modular switch elements, where E is a non-zero integer, wherein a Jth one of the E modular switch elements further comprises, where J is an integer index ranging from 0 to (E-1):
  - I input ports coupled to receive the Jth bit of each of the I inputs;
  - a memory array coupled to the I input ports;
  - O output ports coupled to the memory array to output the Jth bit of each of the O outputs;
  - control logic coupled to the I input ports, to the memory array and to the O output ports, the control logic writing data input to the I input ports into the memory array responsive to a first set of control signals and the control logic reading data stored in the memory array to the O output ports responsive to a second set of control signals; and
- a controller coupled to each of the E modular switch elements, the controller generating the first and second set of control signals.

13. The shared memory switch fabric of claim 12 wherein the control logic writes data input to the I input ports into the memory array responsive to the first set of control signals and to a size signal, and wherein the control logic reads data stored in the memory array to the O output ports responsive to the second set of control signals and to the size signal.

14. The shared memory switch fabric of claim 12 wherein one of the first set of control signals indicates a beginning of a data cell.

15. The shared memory switch fabric of claim 12 wherein each of the E modular switch elements further comprises an input address register file and an output address, and wherein the first and second set of control signals are generated by the input address register file and the output address register file, respectively.

16. The shared memory switch fabric of claim 12 wherein each of the E modular switch elements further comprises I input shift-registers and O output shift-registers coupled to the I input ports and to the O output ports, respectively.

17. The shared memory switch fabric of claim 16 wherein a plurality of the O output shift-registers simultaneously begin outputting a plurality of O data cells.

18. The shared memory switch fabric of claim 12 further comprising a cell identifier bus, wherein the cell identifier bus outputs a predetermined portion of each data cell to the controller.

* * * * *